United States Patent
Zhou et al.

(10) Patent No.: US 9,554,191 B2
(45) Date of Patent: Jan. 24, 2017

(54) METHOD AND SYSTEM FOR IMPLEMENTING INTERACTIVE TELEVISIONS THROUGH NEAR FIELD COMMUNICATION TECHNOLOGIES

(71) Applicant: HUIZHOU TCL MOBILE COMMUNICATION CO., LTD., Huizhou, Guangdong (CN)

(72) Inventors: Baozhong Zhou, Huizhou (CN); Kun Xiao, Huizhou (CN); Jie Shen, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 14/402,002

(22) PCT Filed: Jul. 24, 2013

(86) PCT No.: PCT/CN2013/079988
§ 371 (c)(1),
(2) Date: Nov. 18, 2014

(87) PCT Pub. No.: WO2014/089972
PCT Pub. Date: Jun. 19, 2014

(65) Prior Publication Data
US 2015/0106863 A1     Apr. 16, 2015

(30) Foreign Application Priority Data
Dec. 10, 2012   (CN) .......................... 2012 1 0526758

(51) Int. Cl.
*H04N 7/173*     (2011.01)
*H04N 21/4788*   (2011.01)
(Continued)

(52) U.S. Cl.
CPC .......... *H04N 21/4788* (2013.01); *H04H 20/08* (2013.01); *H04H 20/63* (2013.01);
(Continued)

(58) Field of Classification Search
None
See application file for complete search history.

(56) References Cited

U.S. PATENT DOCUMENTS 5,598,415 A *  1/1997  Nuber .................... H04L 29/06
                                                       348/465
6,434,171 B1 *  8/2002  Ishida ................ H04N 21/2362
                                                       370/235

(Continued)

FOREIGN PATENT DOCUMENTS

CN       101378487 A       3/2009
CN       101945263 A       1/2011
(Continued)

*Primary Examiner* — William J Kim
(74) *Attorney, Agent, or Firm* — Ladas & Parry LLP

(57) ABSTRACT

Interactive data, audio data, and video data are respectively encoded and packaged, and then an interactive television program is produced by multiplexing them. A receiving terminal receives the interactive television program and performs unpacking and decoding. The unpacked interactive data are transmitted by a near field communication module. An operating terminal receives the unpacked interactive data by a near field communication module thereof, parses out corresponding participatory information, and carries out the interaction with the content of the present television program.

17 Claims, 2 Drawing Sheets

(51) Int. Cl.

| | |
|---|---|
| *H04N 21/4363* | (2011.01) |
| *H04H 60/80* | (2008.01) |
| *H04N 21/236* | (2011.01) |
| *H04N 21/2389* | (2011.01) |
| *H04N 21/434* | (2011.01) |
| *H04N 21/435* | (2011.01) |
| *H04N 21/472* | (2011.01) |
| *H04N 21/81* | (2011.01) |
| *H04N 21/8545* | (2011.01) |
| *H04N 21/8547* | (2011.01) |
| *H04H 20/08* | (2008.01) |
| *H04H 20/63* | (2008.01) |
| *H04N 21/41* | (2011.01) |
| *H04H 20/38* | (2008.01) |

(52) U.S. Cl.
 CPC ...... *H04H 60/80* (2013.01); *H04N 21/23614* (2013.01); *H04N 21/23892* (2013.01); *H04N 21/4126* (2013.01); *H04N 21/435* (2013.01); *H04N 21/4348* (2013.01); *H04N 21/43637* (2013.01); *H04N 21/472* (2013.01); *H04N 21/816* (2013.01); *H04N 21/8545* (2013.01); *H04N 21/8547* (2013.01); *H04H 20/38* (2013.01); *H04H 2201/37* (2013.01)

(56) References Cited

U.S. PATENT DOCUMENTS

| | | | | |
|---|---|---|---|---|
| 6,578,201 | B1* | 6/2003 | LaRocca | H04N 5/44543 348/E5.105 |
| 7,565,677 | B1* | 7/2009 | Crinon | H04N 21/235 370/487 |
| 2002/0003773 | A1* | 1/2002 | Okada | H04L 5/06 370/208 |
| 2003/0163832 | A1* | 8/2003 | Tsuria | H04N 5/76 725/135 |
| 2004/0031058 | A1* | 2/2004 | Reisman | G06F 17/30873 725/112 |
| 2004/0131335 | A1* | 7/2004 | Halgas, Jr. | H04N 5/4401 386/213 |
| 2004/0139480 | A1 | 7/2004 | Delpuch et al. | |
| 2007/0115822 | A1* | 5/2007 | Odijk | H04L 12/2801 370/235 |
| 2010/0086285 | A1* | 4/2010 | Sasaki | G11B 27/105 386/212 |
| 2011/0177775 | A1* | 7/2011 | Gupta | H04H 20/93 455/3.06 |
| 2012/0019674 | A1* | 1/2012 | Ohnishi | G08C 17/00 348/207.1 |

FOREIGN PATENT DOCUMENTS

| | | |
|---|---|---|
| CN | 102202127 A | 9/2011 |
| CN | 103024450 A | 4/2013 |
| CN | 103167354 A | 6/2013 |

* cited by examiner

METHOD AND SYSTEM FOR IMPLEMENTING INTERACTIVE TELEVISIONS THROUGH NEAR FIELD COMMUNICATION TECHNOLOGIES

CROSS REFERENCE TO RELATED APPLICATION

This application claims the priority of International Application No. PCT/CN2013/079988, filed on Jul. 24, 2013, which claims priority to Chinese Application No. 201210526758.X, filed on Dec. 10, 2012. The entire disclosures of each of the above applications are incorporated herein by reference.

TECHNICAL FIELD OF THE INVENTION

The present invention relates to a digital television technology, and in particular to a method and system for implementing interactive televisions through near field communication (NFC) technologies.

BACKGROUND OF THE INVENTION

A traditional broadcast television (TV) delivers news, entertainment and a variety of special programs to viewers in the form of one-way broadcast. In recent years, with the popularity of a digital television and an internet protocol television (IPTV), some interactive features, such as catch-up TV, video on demand, information functions, etc. have been provided for the audience. However, these interactive features are basically irrelevant to the content of TV programs; they cannot let the audience interact with the present content of the watched TV program.

Thus, there is a requirement to improve and enhance the prior art.

SUMMARY OF THE INVENTION

An objective of the present invention is to provide a method for implementing interactive televisions through near field communication technologies, thereby solving the drawback that the viewer cannot interact with the content of the TV program in the prior art.

To achieve the foregoing objective, the technical solution of the invention is implemented as follows.

A method for implementing interactive televisions through near field communication technologies includes:

A, respectively encoding and packaging interactive data, audio data, and video data to form a corresponding interactive data packetized elementary stream (PES), audio packetized elementary stream, and video packetized elementary stream, producing an interactive TV program by multiplexing, and transmitting via a digital television network, wherein a Motion Picture Experts Group 2 (MPEG-2) encoding scheme is utilized in encoding the audio data and the video data;

B, receiving the interactive TV program by a receiving terminal, unpacking the audio packetized elementary stream, the video packetized elementary stream, and the interactive data packetized elementary stream of the interactive TV program during a first predetermined time according to a decoding timestamp information; controlling a near field communication module of the receiving terminal to enter a peer-to-peer mode for transmitting interactive data during a second predetermined time according to a presentation time-stamp information; and C, receiving the unpacked interactive data by a near field communication module of an operating terminal, parsing out corresponding participatory information of the present TV program from the interactive data, and carrying out interaction with the content of the present TV program based on the participatory information.

Another objective of the present invention is to provide a method for implementing interactive televisions through near field communication technologies, thereby solving the drawback that the viewer cannot interact with the content of the TV program in the prior art.

To achieve the foregoing objective, the technical solution of the present invention is implemented as follows.

A method for implementing interactive televisions through near field communication technologies includes:

A, respectively encoding and packaging interactive data, audio data, and video data to form a corresponding interactive data packetized elementary stream, audio packetized elementary stream, and video packetized elementary stream, producing an interactive TV program by multiplexing, and transmitting via a digital television network;

B, receiving the interactive TV program by a receiving terminal for unpacking, decoding, and displaying the audio packetized elementary stream, the video packetized elementary stream, and the interactive data packetized elementary stream of the interactive TV program, and adjusting a mode of a near field communication module of the receiving terminal for transmitting the unpacked interactive data in the adjusted mode; and C, receiving the unpacked interactive data by a near field communication module of an operating terminal, parsing out corresponding participatory information of the present TV program from the interactive data, and carrying out interaction with the content of the present TV program based on the participatory information.

Yet another objective of the present invention is to provide further a system for implementing interactive televisions through near field communication technologies, thereby solving the drawback that the viewer cannot interact with the content of the TV program in the prior art.

To achieve the foregoing objective, the technical solution of the present invention is implemented as follows.

A system for implementing interactive televisions through near field communication technologies includes:

an interactive television production module, configured to respectively encode and package interactive data, audio data, and video data to form a corresponding interactive data packetized elementary stream, audio packetized elementary stream, and video packetized elementary stream, and to produce an interactive TV program by multiplexing;

a digital television network, configured to transmit the interactive TV program;

a receiving terminal, configured to receive the interactive TV program for unpacking, decoding, and displaying the audio packetized elementary stream, the video packetized elementary stream, and the interactive data packetized elementary stream of the interactive TV program, and adjusting a mode of a near field communication module of the receiving terminal for transmitting the unpacked interactive data in the adjusted mode; and an operating terminal, configured to receive the unpacked interactive data, to parse out corresponding participatory information of the present TV program from the interactive data, and carrying out interaction with the content of the present TV program based on the participatory information.

Among them, the interactive television production module is in communication with the receiving terminal via the digital television network, and the receiving terminal is in communication with the operating terminal. In comparison with the prior art, the method and system for implementing the interactive televisions through NFC technologies provided by the present invention adds the interactive data into the audio data and the video data for respectively performing the encoding and the packaging to form the corresponding interactive data PES, audio PES, and video PES, and produces, by multiplex, the interactive TV program which is transmitted to the receiving terminal via the digital television network. The interactive data PES, the audio PES, and the video PES of the interactive TV program are correspondingly unpacked, decoded, and displayed in the receiving terminal. By adjusting the mode of the NFC module of the receiving terminal, the unpacked interactive data are transmitted in the adjusted mode. The NFC module of the receiving terminal receives the unpacked interactive data, and analyzes the corresponding participatory information in the present TV program from the interactive data. The interaction is carried out according to the participatory information and the content of the present TV program. The present invention realizes the data communication between the receiving terminal and the operating terminal through the NFC technologies, and achieves the objective of the interaction between the content of TV programs and the operating terminal.

DETAILED DESCRIPTION OF THE INVENTION

The present invention provides a method and system for implementing interactive televisions through NFC technologies. An NFC module is disposed in a receiving terminal for communicating with a conventional operating terminal having had an NFC module. The operating terminal is utilized as a "second screen" of the receiving terminal. A produced interactive TV program with interactive data is transmitted to the receiving terminal via a digital television network. In the receiving terminal, a data stream of the interactive TV program is processed correspondingly. In particular, the data stream related to the interactive data is unpacked during a predetermined time. A mode of the NFC module of the receiving terminal is adjusted. The processed interactive data are transmitted to the operating terminal by the adjusted mode. The operating terminal is capable of carrying out the corresponding interactive operation based on the received interactive data, thereby realizing the interaction with the content of the TV program. Reference will now be made in detail to the present preferred embodiment of the invention. An example of which is illustrated in the accompanying drawings. It should be understood that the specific embodiment described herein is merely utilized to explain the present invention but not to limit the present invention.

Figure 1:
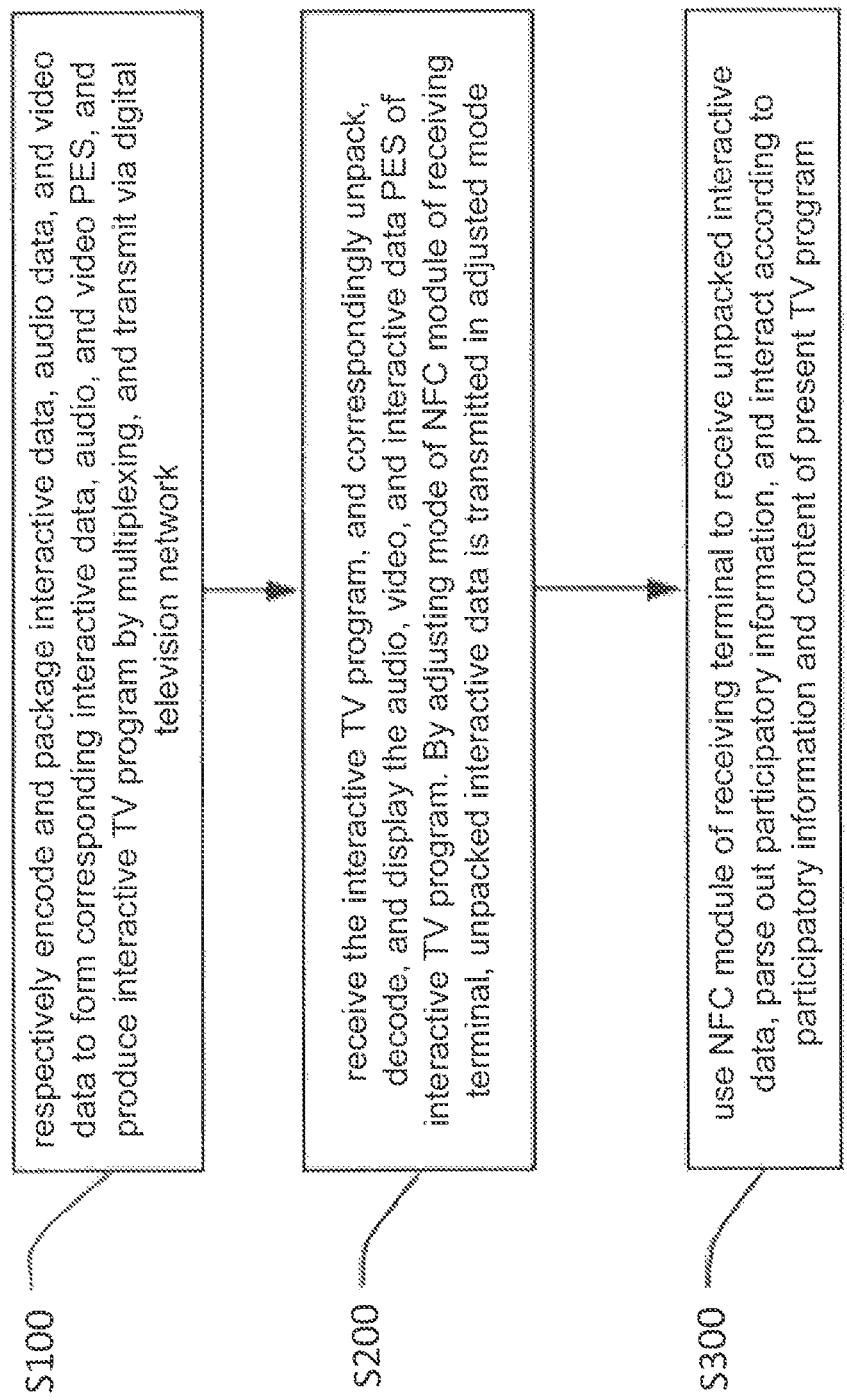
FIG. 1 is a flow chart illustrating a method for implementing interactive televisions through near field communication technologies according to the present invention.
Figure 2:
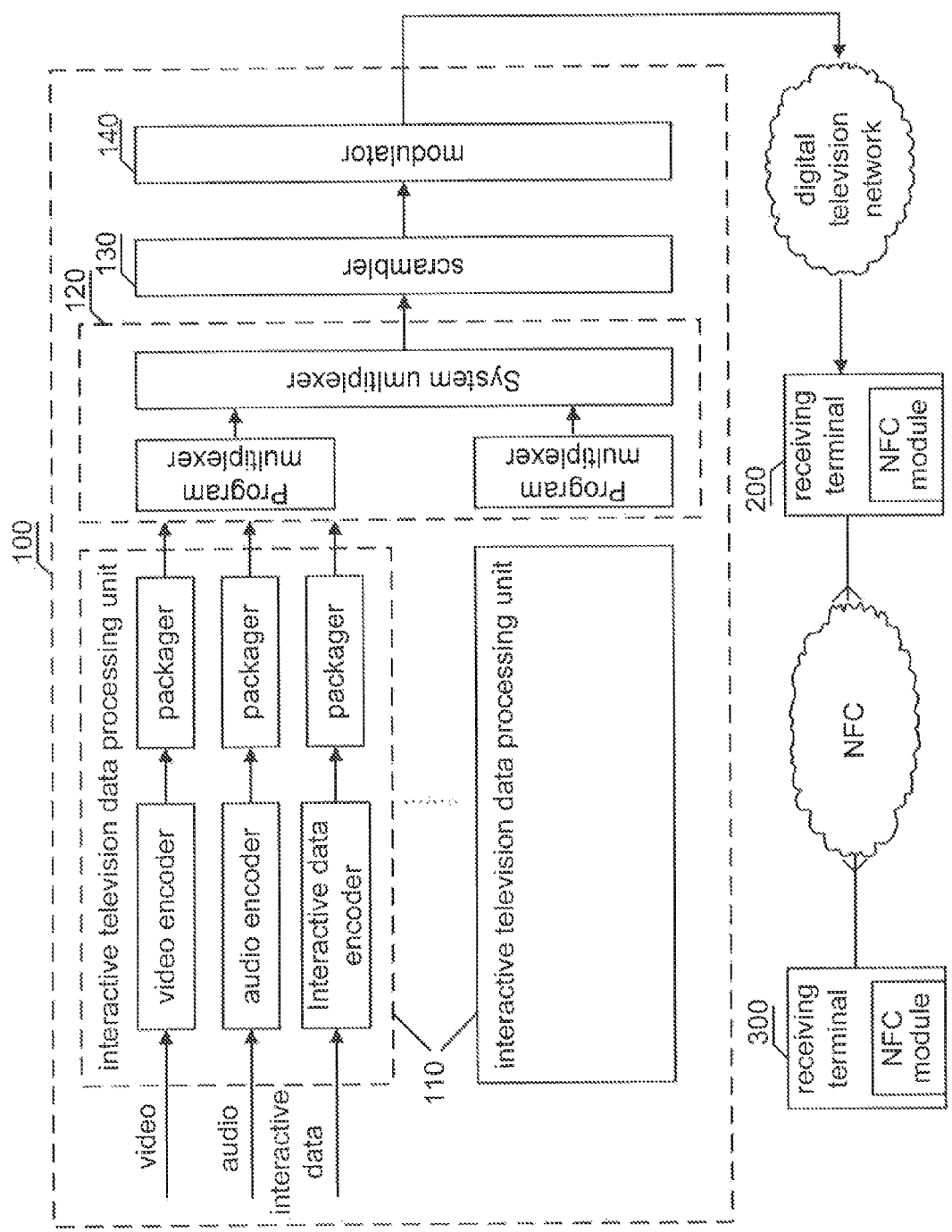
FIG. 2 is a block diagram illustrating a system for implementing interactive televisions through near field communication technologies according to the present invention.

Referring to FIG. 1 and FIG. 2 simultaneously, FIG. 1 is a flow chart illustrating a method for implementing interactive televisions through near field communication technologies according to the present invention; FIG. 2 is a block diagram illustrating a system for implementing interactive televisions through near field communication technologies according to the present invention.

Referring to FIG. 2, the present invention provides a system for implementing interactive televisions through near field communication technologies. The system includes an interactive television production module 100, a digital television network, a receiving terminal 200, and an operating terminal 300. The interactive television production module 100 is in communication with the receiving terminal 200 via the digital television network, and the receiving terminal 200 is in communication with the operating terminal 300.

The interactive television production module 100 herein is configured to respectively encode and package interactive data, audio data, and video data to form a corresponding interactive data packetized elementary stream (PES), audio PES, and video PES, and to produce an interactive TV program by multiplexing. The interactive television production module 100 includes an interactive television data processing unit 110, a multiplexer 120, a scrambler 130, and a modulator 140.

The interactive television data processing unit 110 is configured to respectively encode and package the audio data, the video data, and the interactive data to form the audio PES, the video PES, and the interactive data PES. In the embodiment, the number of the interactive television data processing unit 110 is multiple, all of which are coupled to the multiplexer 120. The multiplexer 120, the scrambler 130, and the modulator 140 are coupled in sequence.

The multiplexer 120 is configured to multiplex the audio PES, the video PES, and the interactive data PES into a multiple program transport stream. The multiplexer 120 includes a plurality of program multiplexers and one system multiplexer. The program multiplexers are capable of multiplexing the audio PES, the video PES, and the interactive data PES into a single program transport stream, and the system multiplexer is capable of multiplexing a plurality of single program transport streams into the multiple program transport stream. The plurality of program multiplexers is coupled to the system multiplexer, and one of the plurality of program multiplexers is correspondingly coupled to one of the plurality of the interactive television data processing units 110.

The interactive television data processing unit 110 includes a video encoder, an audio encoder, an interactive data encoder, and three packagers. The video encoder, the audio encoder, the interactive data encoder are respectively coupled to the three packagers, and every packager is coupled to the same program multiplexer.

The scrambler 130 is configured to scramble the multiple program transport stream. The modulator 140 is configured to modulate the scrambled multiple program transport stream to obtain the interactive TV program and then transmits it. The modulator 140 is a Quadrature Amplitude Modulation (QAM) modulator. The digital television network is utilized to transmit the interactive TV program to the receiving terminal 200. The receiving terminal 200 receives the interactive TV program, and correspondingly unpacks, decodes, and displays the audio PES, the video PES, and the interactive data PES of the interactive TV program, and then adjusts the mode of the NFC module of the receiving terminal 200 for transmitting the unpacked interactive data in the adjusted mode. The operating terminal 300 receives the interactive data unpacked by the receiving terminal 200, and analyzes corresponding participatory information of the present TV program from the interactive data, and carrying out the interaction based on the participatory information and the content of the present TV program.

In a specific implementation, the audio encoder, the video encoder, the interactive data encoder respectively encode the inputted audio data, video data, interactive data. Then they are packaged by the packagers to form the audio PES, the video PES, and the interactive data PES, and they are multiplexed into the single program transport stream by the program multiplexer. The plurality of single program transport streams are input into the system multiplexer to multiplex into one multiple program transport stream. Then the interactive TV program is made by scrambling and modulating the multiple program transport stream. The interactive TV program is transmitted to the digital television network. The receiving terminal 200 receives the interactive TV program from the digital television network to decode and display the audio PES and the video PES for carrying out audio and video playback. While decoding, the receiving terminal 200 determines whether there is an interactive data PES needed to be transmitted at present according to Decoding Time Stamp (DTS)/Presentation Time Stamp (PTS) information. If so, the interactive data PES in the interactive TV program is unpacked to form the interactive data during a first predetermined time, and the NFC module of the receiving terminal 200 is controlled to enter a peer-to-peer (P2P) mode for transmitting the interactive data during a second predetermined time. After the NFC module of the operating terminal 300 receives the interactive data, the corresponding interactive operation can be carried out based on the received interactive data.

The method for implementing interactive televisions through near field communication technologies provided by the present invention includes:

S100, respectively encoding and packaging the interactive data, the audio data, and the video data to form the corresponding interactive data PES, audio PES, and video PES, and producing the interactive TV program by multiplexing, and transmitting via the digital television network;

The content of TV programs usually includes multiple audio data and video data. In order to realize the interaction with the content of TV programs, in producing the TV program, the interactive data, audio data, and video data form the multiple program transport stream by the processes of encoding, packaging, multiplexing and so on, and then form the interactive TV program by scrambling and modulating. In the embodiment, the interactive TV program is produced by the interactive television production module 100. The step S100 specifically includes:

S110, dividing a plurality of audio data, video data, and interactive data in a TV program into multiple groups of program data, each group of program data comprising an audio data, a video data of a frame, and an interactive data;

Typically, a video data of a frame and audio data are output synchronously, and the audio data and the video data correspond with each other. The plurality of audio data and video data are divided into different groups according to the corresponding manners and the information of the carried content, and a corresponding interactive data is added to each group to form a group of program data.

S120, respectively encoding and packaging the audio data, the video data, and the interactive data of each group of program data to form the corresponding audio PES, video PES, and interactive data PES;

inputting the audio data, the video data, and the interactive data together of one group of program data into the interactive television data processing unit 110. The number of the interactive television data processing unit 110 is multiple. In a specific implementation, one group of program data corresponds to one interactive television data processing unit 110. First, the audio data, the video data, and the interactive data are encoded respectively by the audio encoder, the video encoder, and the interactive data encoder of the interactive television data processing unit 110, secondly packaged by the packagers, and finally forms the audio PES, the video PES, and the interactive data PES. The audio PES is an audio data stream with a package header; the video PES is a video data rate with a package header; and the interactive data PES is an interactive data stream with a package header. Each group of program data is encoded and packaged in the interactive television data processing unit 110 which corresponds thereto. Each interactive television data processing unit 110 will output a set of data streams, i.e., a set of audio PES, video PES, and interactive data PES. Furthermore, a Motion Picture Experts Group 2 (MPEG-2) encoding scheme is utilized in encoding the audio data and the video data. It follows the specifications including: ISO (International Organization for Standardization)/IEC (International Electrotechnical Commission) 13818-1, ISO/IEC 13818-2, ISO/IEC 13818-3, ISO/IEC 13818-7. The encoding scheme for encoding the interactive data includes a uniform resource locator (URL), textual data, or universal control data. They follow the specifications including: NFC Forum NFC Data Exchange Format (NDEF) specification, NFC Forum URI Record Type Definition specification, NFC Forum Text Record Type Definition specification, and NFC Forum Generic Control Record Type Definition specification. The process of packaging the interactive data follows the specification of ISO/IEC 13818-1.

The step S120 herein further includes:

A21, depending on the time of the program content, adding corresponding DTS/PTS information to the encoded interactive data, video data, and audio data for carrying out the packaging. The process of packaging is by adding a PES package header to interactive data, audio, and video elementary streams (ES). The process of adding the DTS/PTS information follows the specification of ISO/IEC 13818-1.

S130, multiplexing the audio PES, the video PES, and the interactive data PES into the single program transport stream, and then multiplexing the plurality of single program transport streams into one multiple program transport stream.

One interactive television data processing unit 110 corresponds to one program multiplexer, and one set of the audio PES, the video PES, and the interactive data PES which are input to the program multiplexer can be multiplexed as one single program transport stream. Multiple sets of the audio PES, the video PES, and the interactive data PES can from the plurality of single program transport streams, and the plurality of single program transport streams can be multiplexed into one multiple program transport stream by the system multiplexer. The process of the step S130 follows the specification of ISO/IEC 13818-1.

S140, scrambling the multiple program transport stream and modulating that to form the interactive TV program, and transmitting that via the digital television network. The scrambling can enhance confidentiality of the multiple program transport stream.

S200, the receiving terminal receives the interactive TV program, and correspondingly unpacks, decodes, and displays the audio PES, the video PES, and the interactive data PES of the interactive TV program. By adjusting the mode of the NFC module of the receiving terminal, the unpacked interactive data is transmitted in the adjusted mode.

In the embodiment, the receiving terminal 200 is an NFC-enabled smart TV or set-top box. That is, the smart TV or set-top box has an NFC module disposed therein, and can realize the communication between the receiving terminal 200 and the operating terminal 300 by the NFC module. The step S200 specifically includes steps:

S210, receiving the interactive TV program by the receiving terminal;

S220, unpacking the audio PES and the video PES, according to Program Specific Information (PSI)/Service Information (SI) in a single program transport stream, to form the corresponding audio data and video data; decoding and displaying the audio data and the video data;

S230, unpacking the interactive data of the interactive TV program during the first predetermined time according to the decoding time-stamp information; and controlling the NFC module of the receiving terminal to enter the P2P mode for transmitting the interactive data during the second predetermined time according to the PTS information.

The audio PES, the video PES, and the interactive data PES herein are the results of the audio data, video data, and interactive data in the primal program data being encoded and packaged. After the audio PES, the video PES, and the interactive data PES are unpacked, they are reduced to the primal audio data, video data, and interactive data. When the receiving terminal 200 unpacks the audio PES and the video PES, it further determines whether there is an interactive data PES needed to be unpacked at present according to the PSI/SI information in the step S220; if so, then execution resumes in step S230. If not, the audio data and the video data of the interactive TV program are unpacked during the first predetermined time according to the DTS information; the NFC module of the receiving terminal 200 is controlled to enter the P2P mode for transmitting the interactive data during the second predetermined time according to the PTS information. The first predetermined time is determined by the DTS information, and the second predetermined time is determined by the PTS information.

S300, using the NFC module of the receiving terminal 300 to receive the unpacked interactive data, and parse out the corresponding participatory information in the present TV program from the interactive data. The interaction is carried out according to the participatory information and the content of the present TV program.

The receiving terminal 200 and the operating terminal 300 realize the near field communication by their NFC modules, which can transmit the unpacked interactive data. The operating terminal 300 is an NFC-enabled mobile phone; that is, the mobile phone is equipped with an NFC module. The mobile phone controls the NFC module to enter the P2P mode for obtaining the interactive data, and the corresponding interactive operation can be carried out based on the received interactive data.

The system can flexibly support a variety of interactive operations. For instance, when the present TV program is a live sports program and when the host asks the audience to send messages for participating in the interaction, the operating terminal can parse out the numbers of a messaging platform or the web site address of the interaction from the interactive data, thereby directly participating the interaction. When the present TV program is an advertisement for a certain product, the operating terminal can parse out the web site address of the product, thereby understanding the product details or directly ordering it.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A method for implementing interactive televisions through near field communication technologies, comprising:
   A, encoding and packaging interactive data, audio data, and video data respectively to form a corresponding interactive data packetized elementary stream, audio packetized elementary stream, and video packetized elementary stream, producing an interactive television program by multiplexing the elementary streams, and transmitting the interactive television program via a digital television network, wherein the audio data and the video data are encoded by using a Motion Picture Experts Group 2 (MPEG-2) encoding scheme;
   B, receiving the interactive television program by a receiving terminal, unpacking the audio packetized elementary stream, the video packetized elementary stream, and the interactive data packetized elementary stream of the interactive television program during a first predetermined time according to a decoding time-stamp information; and determining whether there is the interactive data packetized elementary stream in the interactive television program, if so, then controlling a near field communication module of the receiving terminal to enter a peer-to-peer mode for transmitting the interactive data during a second predetermined time according to a presentation time-stamp information; and
   C, receiving the unpacked interactive data by a near field communication module of an operating terminal, parsing out corresponding participatory information of the present television program from the interactive data by the near field communication module of the operating terminal, and carrying out a real-time interaction with content of the present television program based on the participatory information,
   wherein the step A comprises:
   A1, dividing a plurality of audio data, video data and interactive data in a television program into multiple groups of program data, each group of program data comprising an audio data, a video data of a frame, and an interactive data;
   A2, encoding and packaging the audio data, the video data and the interactive data of each group of program data, respectively, to form the corresponding audio packetized elementary stream, video packetized elementary stream, and interactive data packetized elementary stream;
   A3, multiplexing the audio packetized elementary stream, the video packetized elementary stream, and the interactive data packetized elementary stream into a single program transport stream, and then multiplexing a plurality of single program transport streams into a multiple program transport stream; and
   A4, scrambling and modulating the multiple program transport stream to form the interactive television program, and transmitting the interactive television program via the digital television network.

2. The method according to claim 1, wherein the step A2 further comprises:
   A21, adding, depending on the time of the program content, corresponding decoding time-stamp and presentation time-stamp information to the encoded interactive data, video data, and audio data for carrying out the packaging.

3. The method according to claim 1, wherein, in the step A2, the packaging is done by adding a packetized elementary stream package header to each of the interactive data, audio, and video elementary streams.

4. The method according to claim 1, wherein the step B comprises:

B1, receiving the interactive television program by the receiving terminal;

B2, unpacking the audio packetized elementary stream and the video packetized elementary stream, according to program specific information and service information in a single program transport stream, to form the corresponding audio data and video data; decoding and displaying the audio data and the video data;

B3, unpacking the interactive data of the interactive television program during the first predetermined time according to the decoding time-stamp information, controlling the near field communication module of the receiving terminal to enter the peer-to-peer mode for transmitting the interactive data during the second predetermined time according to the presentation time-stamp information.

5. The method according to claim 4, wherein the step B2 further comprises:

determining whether there is an interactive data packetized elementary stream needed to be unpacked at present when unpacking the audio packetized elementary stream and the video packetized elementary stream according to the program specific information and the service information of the program;

if so, then performing step B3;

if not, then unpacking the audio data and the video data of the interactive television program during the first predetermined time according to the decoding time-stamp information, and controlling the near field communication module of the receiving terminal to enter the peer-to-peer mode for transmitting the interactive data during the second predetermined time according to the presentation time-stamp information.

6. The method according to claim 1, wherein an encoding scheme for encoding the interactive data in the step A2 comprises a uniform resource locator (URL), textual data, and universal control data.

7. A method for implementing interactive televisions through near field communication technologies, comprising:

A, encoding and packaging interactive data, audio data, and video data respectively to form a corresponding interactive data packetized elementary stream, audio packetized elementary stream, and video packetized elementary stream, producing an interactive television program by multiplexing the elementary streams, and transmitting the interactive television program via a digital television network;

B, receiving the interactive television program by a receiving terminal for unpacking, decoding, and displaying the audio packetized elementary stream, the video packetized elementary stream, and the interactive data packetized elementary stream of the interactive television program, and determining whether there is the interactive data packetized elementary stream in the interactive television program, if so, then adjusting a mode of a near field communication module of the receiving terminal for transmitting the unpacked interactive data in the adjusted mode; and C, receiving the unpacked interactive data by a near field communication module of an operating terminal, parsing out corresponding participatory information of the present television program from the interactive data by the near field communication module of the operating terminal, and carrying out a real-time interaction with the content of the present television program based on the participatory information, wherein the step A comprises:

A1, dividing a plurality of audio data, video data and interactive data in a television program into multiple groups of program data, each group of program data comprising an audio data, a video data of a frame, and an interactive data;

A2, encoding and packaging the audio data, the video data, and the interactive data of each group of program data, respectively, to form the corresponding audio packetized elementary stream, video packetized elementary stream, and interactive data packetized elementary stream;

A3, multiplexing the audio packetized elementary stream, the video packetized elementary stream, and the interactive data packetized elementary stream into a single program transport stream, and then multiplexing a plurality of single program transport streams into a multiple program transport stream; and A4, scrambling and modulating the multiple program transport stream to form the interactive television program, and transmitting the interactive television program via the digital television network.

8. The method according to claim 7, wherein the step A2 further comprises:

A21, adding corresponding decoding time-stamp and presentation time-stamp information to the encoded interactive data, video data, and audio data for carrying out the packaging depending on the time of the program content.

9. The method according to claim 7, wherein, in the step A2, the packaging is done by adding a packetized elementary stream package header to each of the interactive data, audio, and video elementary streams.

10. The method according to claim 7, wherein the step B comprises:

B1, receiving the interactive television program by the receiving terminal;

B2, unpacking the audio packetized elementary stream and the video packetized elementary stream, according to program specific information and service information in a single program transport stream, to form the corresponding audio data and video data; decoding and displaying the audio data and the video data;

B3, unpacking the interactive data of the interactive television program during the first predetermined time according to the decoding time-stamp information, and controlling the near field communication module of the receiving terminal to enter a peer-to-peer mode for transmitting the interactive data during a second predetermined time according to a presentation time-stamp information.

11. The method according to claim 10, wherein the step B2 further comprises:

in unpacking the audio packetized elementary stream and the video packetized elementary stream, determining whether there is an interactive data packetized elementary stream needed to be unpacked at present according to the program specific information and the service information of the program;

if so, then performing step B3;

if not, then unpacking the audio data and the video data of the interactive television program during the first predetermined time according to the decoding timestamp information, and controlling the near field communication module of the receiving terminal to enter the peer-to-peer mode for transmitting the interactive data during the second predetermined time according to the presentation time-stamp information.

12. The method according to claim 7, wherein a MPEG-2 encoding scheme is utilized in encoding the audio data and the video data in the step A2; an encoding scheme for encoding the interactive data comprises a URL, textual data, and universal control data.

13. A system for implementing interactive televisions through near field communication technologies, comprising:
one or more processors; and
a memory connected with the one or more processors, the memory comprising a plurality of program instructions executable by the one or more processors, the program instructions comprising:
an interactive television production module utilized to cause the one or more processors to respectively encode and package interactive data, audio data, and video data to form a corresponding interactive data packetized elementary stream, audio packetized elementary stream, and video packetized elementary stream, and to produce an interactive television program by multiplexing the elementary streams;
a digital television network utilized to cause the one or more processors to transmit the interactive television program;
a receiving terminal utilized to cause the one or more processors to receive the interactive television program for unpacking, decoding, and displaying the audio packetized elementary stream, the video packetized elementary stream, and the interactive data packetized elementary stream of the interactive television program, and to determine whether there is the interactive data packetized elementary stream in the interactive television program, if so, then to adjust a mode of a near field communication module of the receiving terminal for transmitting the unpacked interactive data in the adjusted mode; and
an operating terminal utilized to cause the one or more processors to receive the unpacked interactive data, to parse out corresponding participatory information of the present television program from the interactive data, and carrying out a real-time interaction with the content of the present television program based on the participatory information;
the interactive television production module being in communication with the receiving terminal via the digital television network, the receiving terminal being in communication with the operating terminal,
wherein the interactive television production module comprises:
an interactive television data processing unit utilized to cause the one or more processors to respectively encode and package the audio data, the video data, and the interactive data to form the audio packetized elementary stream, the video packetized elementary stream, and the interactive data packetized elementary stream;
a multiplexer utilized to cause the one or more processors to multiplex the audio packetized elementary stream, the video packetized elementary stream, and the interactive data packetized elementary stream into a multiple program transport stream;
a scrambler utilized to cause the one or more processors to scramble the multiple program transport stream; and
a modulator utilized to cause the one or more processors to modulate and transmit the scrambled multiple program transport stream;
wherein the number of the interactive television data processing unit is multiple, all of which are coupled to the multiplexer the multiplexer, the scrambler, and the modulator are coupled in sequence.

14. The system according to claim 13, wherein the multiplexer comprises:
a program multiplexer utilized to cause the one or more processors to multiplex the audio packetized elementary stream, the video packetized elementary stream, and the interactive data packetized elementary stream into a single program transport stream; and
a system multiplexer utilized to cause the one or more processors to multiplex a plurality of single program transport streams into the multiple program transport stream;
wherein the number of the program multiplexer is multiple, and the number of the system multiplexer is one; the plurality of program multiplexers are coupled to the system multiplexer; and one of the plurality of program multiplexers is correspondingly coupled to one of the plurality of the interactive television data processing units.

15. The system according to claim 14, wherein the interactive television data processing unit comprises:
a video encoder;
an audio encoder;
an interactive data encoder; and
three packagers; the three packagers respectively coupled to the video encoder, the audio encoder, and the interactive data encoder, and each packager coupled to one of the plurality of the program multiplexers.

16. The system according to claim 15, wherein an encoding scheme for encoding the interactive data encoder comprises a URL, textual data, and universal control data.

17. The system according to claim 13, wherein the modulator is a Quadrature Amplitude Modulation (QAM) modulator.

* * * * *